(12) United States Patent
Gittler

(10) Patent No.: US 7,222,861 B2
(45) Date of Patent: May 29, 2007

(54) SEALING IN A HYDRAULIC TURBINE UNIT

(76) Inventor: Philipp Gittler, Jodlgasse 7, A-1130, Vienna (AT)

( * ) Notice: Subject to any disclaimer, the term of this patent is extended or adjusted under 35 U.S.C. 154(b) by 295 days.

(21) Appl. No.: 10/363,848

(22) PCT Filed: Sep. 14, 2001

(86) PCT No.: PCT/AT01/00293

§ 371 (c)(1),
(2), (4) Date: Mar. 13, 2003

(87) PCT Pub. No.: WO02/23038

PCT Pub. Date: Mar. 21, 2002

(65) Prior Publication Data

US 2004/0094901 A1 May 20, 2004

(30) Foreign Application Priority Data

Sep. 15, 2000 (AT) ............... A 158/2000
Feb. 22, 2001 (AT) ............... A 278/2001

(51) Int. Cl.
*F16C 32/06* (2006.01)
*F01D 11/04* (2006.01)
*F16J 15/40* (2006.01)
(52) U.S. Cl. ............ 277/422; 277/431; 277/432; 277/401; 384/100; 384/107; 384/112
(58) Field of Classification Search ............ 277/361, 277/363, 399, 400, 401, 422, 431, 432, 579; 384/100, 107
See application file for complete search history.

(56) References Cited

U.S. PATENT DOCUMENTS 1,876,515 A * 9/1932 Emmet .................. 277/401
3,047,299 A * 7/1962 Karsten ................. 277/422
3,917,289 A * 11/1975 Ivanov et al. ........... 277/400

(Continued)

FOREIGN PATENT DOCUMENTS

CH           659856         2/1987

(Continued)

OTHER PUBLICATIONS

English Language Abstract of JP 60-62669, Nov. 28, 2004.

*Primary Examiner*—Alison K. Pickard
(74) *Attorney, Agent, or Firm*—Nixon & Vanderhye P.C.

(57) ABSTRACT

System for providing sealing between a rotor and a turbine casing in a hydraulic turbomachine includes a sealing ring arranged in a peripheral region of the rotor. The sealing ring forms at least one hydrostatic bearing with respect to at least one of the rotor and the turbine casing. The at least one hydrostatic bearing includes at least two bearing surfaces which face one another. At least one of the at least two bearing surfaces is arranged on the sealing ring. At least another of the at least two bearing surfaces is arranged on at least one of the rotor and the turbine casing. At least one groove is formed on at least one of the at least two bearing surfaces. At least one pressure-liquid line is coupled to each of the at least one groove and a pressure-liquid supply. This Abstract is not intended to define the invention disclosed in the specification, nor intended to limit the scope of the invention in any way.

70 Claims, 5 Drawing Sheets

U.S. PATENT DOCUMENTS

| | | | |
|---|---|---|---|
| 4,114,058 A * | 9/1978 | Albaric | 310/54 |
| 4,118,040 A * | 10/1978 | Christ et al. | 277/432 |
| 4,486,024 A * | 12/1984 | Cooper | 277/422 |
| 4,579,349 A * | 4/1986 | Pipich et al. | 277/422 |
| 5,052,694 A * | 10/1991 | Lipschitz | 277/388 |
| 5,147,015 A | 9/1992 | Snuttjer et al. | |
| 5,186,277 A | 2/1993 | Snuttjer | |
| 5,509,644 A * | 4/1996 | Engibarov | 269/99 |
| 5,516,118 A * | 5/1996 | Jones | 277/400 |
| 5,558,341 A * | 9/1996 | McNickle et al. | 277/400 |
| 5,755,817 A * | 5/1998 | Prouty et al. | 415/112 |
| 6,145,843 A * | 11/2000 | Hwang | 277/400 |
| 2004/0247211 A1* | 12/2004 | Hamke | 384/100 |
| 2005/0087933 A1* | 4/2005 | Gittler | 277/387 |

FOREIGN PATENT DOCUMENTS

| | | |
|---|---|---|
| DE | 2130717 | 12/1971 |
| DE | 2554217 | 3/1977 |
| DE | 19611677 | 8/1996 |
| EP | 1098088 | 5/2001 |
| FR | 1014712 | 6/1952 |
| FR | 2098520 | 3/1972 |
| FR | 2144969 | 2/1973 |
| GB | 839880 | 6/1960 |
| JP | 60-62669 | 4/1985 |
| WO | 93/121464 | 10/1993 |

* cited by examiner

SEALING IN A HYDRAULIC TURBINE UNIT

CROSS-REFERENCE TO RELATED APPLICATIONS

The present application is a National Stage Application of International Application No. PCT/AT01/00293, filed Sep. 14, 2001. Further, the present application claims priority under 35 U.S.C. § 119 of Austrian Patent Application Nos. A 1581/2000 filed on Sep. 15, 2000 and A 278/2001 filed on Feb. 22, 2001.

BACKGROUND OF THE INVENTION

1. Field of the Invention

The invention relates to the sealing-off of the rotor of hydraulic turbomachines, such as turbines, pumpturbines, accumulator pumps or other pumps, with respect to the turbine casing.

2. Discussion of Background Information

Kaplan turbines for low, Francis turbines for medium and Pelton turbines for high fall heights form the modem standard repertoire in the field of turbine construction. Francis turbines in this case cover essentially the fall-height range of between 30 m and 400 m.

In this context, Francis turbines reach efficiencies of about 95% in the lower fall-height range and of up to more than 92% in the upper fall-height range. Particularly in the upper fall-height range, the gap losses and disc friction are responsible for the decrease in efficiency which it has hitherto been impossible to eliminate. To explain these two phenomena, the construction and operation of a Francis turbine will be dealt with briefly below:

In Francis turbines, the water driving the turbine flows out of a horizontally lying spiral through a guide wheel to the rotor. The rapidly rotating rotor converts the pressure and velocity energy of the water into the rotational movement of the shaft, on which the rotor is fastened, and consequently drives a generator for current generation. The driving water leaves the rotor and also the turbine through a suction pipe downwards in the axial direction.

In the peripheral region of the rotor, at the outer ends of the blade ducts, the latter move at high speed past the stationary turbine casing, and, between these parts, it is not possible to avoid a gap, through which the water coming from the guide blades flows past the rotor and thus passes into the gap-like regions between the outer surface of the rotor and the inner surface of the turbine casing. Considerable frictional losses occur due to the high speed differences between the stationary casing and the rotating rotor. Furthermore, the high pressure prevailing in the upper gap generates a powerful axial thrust which subjects the shaft and the axial bearing to extreme load. For this reason, a labyrinth seal is provided in the outer circumferential region of the rotor and the water passing through this labyrinth seal is led past the turbine. The prior art thus accepts a leakage which, even in medium-sized turbines, may amount to 0.5 m$^3$/s.

Since, then, for the reason mentioned, the labyrinth seal is arranged in the outer region of the rotor, the small gap widths which are sought after give rise to considerable frictional losses and high braking torques. Furthermore, these seals are costly to produce and, precisely also because of the high relative speeds between the surfaces located opposite one another, are exposed by the impurities repeatedly entrained and contained in the water, such as sand grains, wood fragments and the like, to constant wear which makes complicated maintenance work and repairs necessary.

It is not possible to provide an actual seal in the outer region of the rotor in any way other than directly on the shaft which, of course, is led through the casing. The reason for this are, on the one hand, the high relative speeds, already mentioned several times, of the components located opposite one another and, on the other hand, the dynamic problems which arise due to the unavoidable relative movements (transversely to the main rotational movement) in the case of these dimensions and the forces which occur. These relative movements take place essentially in the axial direction and arise in the event of changes in the operating state, but also due to tolerances, bearing play, randomly excited vibrations and the like.

In the electricity generation, then, the question of as high an efficiency as possible is of critical importance, on the one hand, because of commercial considerations and, on the other hand, for reasons of environmental protection. Of the abovementioned 5 to 7% of the energy currently not yet utilized and contained in the driving water, a comparatively large fraction, particularly in the case of Francis turbines operating in the range of high fall heights and consequently pressures, is due to the gap losses and here, in particular, again due to the losses in the upper gap region, in conjunction with the accompanying disc friction.

Various attempts to deal with this problem have already been undertaken. In this respect, reference may be made merely to a proposal which was published under the definition "Polar Sealing" by VA TECH VOEST MCE described in (EP 1 098 088) and in which, in the outer region of the rotor, from the casing outwards, an ice bead is formed by cooling, which, during operation, grows as far as the rotor and comes to bear there in a slightly abrading manner and thus assumes sealing. This is an outstanding example of how difficult it is to seal off in this region of a Francis turbine when one of the leading international companies in the field of the production of turbines of this type proposes such a complicated self-regenerating seal.

The problems associated with this seal are, above all, the risk of breakage of at least part of the ice ring and the subsequent leak, which is why the publication proposes to provide this seal in addition to the traditional labyrinth seal. Although a reduction in leakage and in the problems connected with this can be achieved by means of this strategy, this is nevertheless at the expense of high investment and the use of a complex additional component which requires additional maintenance and care.

A solution with hydrostatic mounting is known from DE 25 54 217 A1 (corresponds to U.S. Pat. No. 4,118,040 from the Search Report): in this case, a sealing ring is held via essentially tangentially running arms and is mounted sealingly in an annular groove of the casing. This sealing with respect to the casing may take place via elastomeric rings or similar elements which are mounted in the groove and which come to bear over a large area on the outer surfaces of the ring, thus, in turn, markedly obstructing the moveability of the latter in the axial direction and thus adversely impairing the change in the gap height between the ring and the rotor. However, in view of the unavoidable axial movement of the rotor with respect to the casing, this change is absolutely necessary in order to achieve as efficient a hydrostatic seal as possible. In a number of exemplary embodiments, the water required for hydrostatic sealing is supplied via tubes or the like, thus further obstructing its moveability.

Another solution is known from CH 659 856 A5: a ring which is essentially immovable with respect to the casing is sealed off with respect to the rotor (hub disc, cover disc) radially and in a non-contact manner by means of hydrostatic sealing, whilst, to improve the rapid adjustability of the gap height, the ring is mounted with as little friction as possible in the axial direction likewise by means of a type of hydrostatic mounting. The bearing water for the axial bearing is in this case branched off from the bearing water for the radial bearing. However, this ring is unavoidably also held on (a plurality of) radially running cylindrical supply lines for the bearing water and is sealed off with respect to these lines by means of O-rings. This mounting of the ring therefore cannot be designated as "floating", since the change in the gap height in the radial bearing is markedly obstructed by these O-rings. The entire construction of the seal is complicated and makes it necessary to adhere to a whole series of narrow tolerances on various components which have considerably large dimensions.

DE 196 11 677 A1 proposes a seal, designated as "non-contact", with a ring, designated as "floating". The ring is in this case mounted on the casing sealingly and in a rotationally fixed and elastically supported manner (and not non-contact), and the cylindrical surface directed towards the rotor has two zones: one which performs the function of a labyrinth seal and one which performs a centring function. The leakage is thus used for centring the ring. There is therefore no hydrostatic bearing in the strict sense. In this proposal, there are major problems in the mounting of the ring on the casing, since, of course, a good moveability of the ring and a leak-tight connection must be achieved simultaneously. How this is to be solved satisfactorily is not stated. Other problems arise from the fact that, in the case of the low leakage to be sought after, centring can scarcely be achieved.

SUMMARY OF THE INVENTION

The purpose of the invention is to provide a seal which, in all the hydraulic turbomachines mentioned in the introduction, brings about a markedly improved sealing action, as compared with the prior art, in a simple and reliable way.

According to the invention, to achieve these aims, there is provision for arranging in the peripheral region of the rotor an overhung sealing ring which is mounted in a non-contact manner both with respect to the rotor and with respect to the casing by hydrostatic floatation. By the designation "overhung" is meant, in this description and in the claims, that the bearing movements of the ring are not counteracted by any guide forces which in their magnitude would exceed the magnitude of the forces of the hydrostatic mounting. In the prior art, forces of this type are, for example, the frictional forces of the elastomeric elements or the frictional forces of the O-rings. By virtue of the invention, the quantity of gap water is drastically decreased, the disc friction is reduced by orders of magnitude and the axial thrust is appreciably diminished. Since, according to the invention, the leakage consists only of bearing water, the risk of the penetration of foreign bodies into the sealing region and consequently the risk of damage to the seal are greatly reduced.

In one embodiment of the invention, the ring is pressed by the surrounding pressure of the water onto the rotor in the axial direction and onto the casing in the radial direction. Consequently, the main movement of the ring takes place in the axial direction, so as to follow the tilting and main deformation of the rotor in its outer region. This is advantageous because of the travel available in this direction.

Hydrostatic bearings in machine building and, in particular, in hydrodynamic machine building are known per se, but it has not been possible hitherto to use them between components, of which the distance from and position in relation to one another may change to an extent such as is the case, for example, on the outer circumference of a rotor of a Francis turbine. Only by the hydrostatic mounting according to the invention with respect to both components is impossible to compensate these tolerances and movements, without having to diminish the sealing action and without having to fear collisions.

In one embodiment of the invention, there is provision for providing, in at least one of the two sealing surfaces between the sealing ring and the rotor, hydrodynamic lubricating pockets, by way of which, in addition to the hydrostatic mounting, a hydrodynamic bearing effect occurs as a result of the relative movement between the sealing ring and the rotor. The stability range of the seal, according to the invention, is thus further increased by way of the hydrodynamic bearing effect.

In a particularly preferred variant of the invention, there is provision for the water under pressure, required for the hydrostatic mounting of the sealing ring with respect to the rotor, to be supplied from a hydrostatic bearing between the casing and the sealing ring by way of bores in the sealing ring. These bores extend to, at one end, the hydrostatic bearing relative to the casing and, at the other end, the hydrostatic bearing relative to the rotor.

Thus, any securing of the sealing ring against rotation becomes superfluous, and there is no need for any water under pressure to be supplied to the sealing ring by way of flexible lines or the like. Furthermore, the bearing friction is substantially decreased as a result of the sealing ring which rotates at approximately half the turbine rotational speed.

In one embodiment of this version, a hydrostatic bearing with two grooves is provided between the casing and the ring. One groove is connected by way of bores to at least one groove of the hydrostatic bearing of the ring with respect to the rotor. This makes it possible to provide two separate feeds for the two bearings, with the result that the axial bearing can be uncoupled from the radial bearing in terms of pressure and fluctuations in one bearing can thus be kept away from the other bearing. This makes an appreciable contribution to the stability of the mounting, more precisely to the bearing movement of the ring.

The invention also provides for a system for providing sealing between a rotor and a turbine casing in a hydraulic turbomachine, wherein the system comprises a sealing ring arranged in a peripheral region of the rotor. The sealing ring forms at least one hydrostatic bearing with respect to at least one of the rotor and the turbine casing. The at least one hydrostatic bearing comprises at least two bearing surfaces which face one another. At least one of the at least two bearing surfaces is arranged on the sealing ring. At least another of the at least two bearing surfaces is arranged on at least one of the rotor and the turbine casing. At least one groove is formed on at least one of the at least two bearing surfaces. At least one pressure-liquid line is coupled to each of the at least one groove and a pressure-liquid supply.

The pressure-liquid line may deliver water and the sealing ring may comprise an overhung sealing ring. The one of the at least two bearing surfaces of the sealing ring may comprise a radially outer cylindrical wall. The other of the at least two bearing surfaces may be arranged on the turbine casing and comprises a radially outer cylindrical wall. The turbine casing may comprise a turbine cover that includes an annular strip, and the radially outer cylindrical wall of the turbine casing may be arranged on the annular strip of the turbine cover. The sealing ring may be non-rotatably mounted. The sealing ring may be secured against rotation with respect to the turbine casing. The at least one pressure-liquid line may comprise a flexible line. The sealing ring may be both flexibly suspended with respect to the turbine casing and secured against rotation with respect to the turbine casing.

The sealing ring may be capable of moving at least one of axially with respect to an axis of rotation of the rotor and essentially in a plane perpendicular to the axis. The sealing ring may be adapted to move axially with respect to an axis of rotation of the rotor. The sealing ring may be adapted to move essentially in a plane perpendicular to an axis of rotation of the rotor. The sealing ring may be adapted to move each of axially with respect to an axis of rotation of the rotor and essentially in a plane perpendicular to the axis.

The at least one pressure-liquid line may deliver liquid to the at least one hydrostatic bearing. The sealing ring may comprise bores for delivering liquid to at least one of the at least two bearing surfaces. The sealing ring may comprise bores for delivering liquid to each of the at least two bearing surfaces. The sealing ring and the turbine casing may each comprise bores for delivering liquid. The bores of the sealing ring and the turbine casing may be arranged to allow liquid to pass from the turbine casing to the sealing ring and from the sealing ring to the rotor. The sealing ring may comprise first bores for delivering liquid and the turbine casing may comprise second bores for delivering liquid. The first bores may be arranged to allow liquid to pass from the turbine casing to the sealing ring and the second bores may be arranged to allow liquid to pass from the sealing ring to the rotor.

The at least one pressure-liquid line may comprise a first pressure line and a second pressure line, wherein the first pressure line is coupled to the first bores, and wherein the second pressure line is coupled to the second bores. The at least one groove may comprise at least two grooves spaced from one another. The first pressure line may deliver liquid to one of the at least two grooves and the second pressure line may deliver liquid to another of the at least two grooves. The at least one groove may comprise at least two grooves spaced from one another.

The at least two grooves may be arranged on an annular axial surface. The at least two grooves may be arranged on an annular axial surface of the sealing ring. The at least two grooves may be arranged on an outer circumferential surface. The at least two grooves may be arranged on an outer circumferential surface of the turbine casing. The at least two grooves may be arranged on an inner circumferential surface. The at least two grooves may be arranged on an inner circumferential surface of the sealing ring.

The invention also provides for a system for providing sealing between a rotor and a turbine casing in a hydraulic turbomachine, wherein the system comprises a sealing ring arranged in a peripheral region of the rotor. The sealing ring forms at least one hydrostatic bearing with respect to at least one of the rotor and the turbine casing. The at least one hydrostatic bearing comprises at least two bearing surfaces which face one another. At least one of the at least two bearing surfaces is arranged on the sealing ring. At least another of the at least two bearing surfaces is arranged on at least one of the rotor and the turbine casing. At least one groove is formed on at least one of the at least two bearing surfaces. At least one pressure-liquid line is coupled to each of the at least one groove and a pressure-liquid supply. The sealing ring rotates with respect to the turbine casing.

The sealing ring may rotate at a lower speed than the rotor. The invention also provides for a method of retrofitting a turbine using the system described herein, wherein the method comprises mounting the sealing ring to the turbine and sealing the rotor to the turbine casing with the sealing ring.

The invention also provides for a system for providing sealing between a rotor and a turbine casing in a hydraulic turbomachine, wherein the system comprises a sealing ring arranged in a peripheral region of the rotor. The sealing ring comprises bores and forming a first hydrostatic bearing with respect to the rotor and a second hydrostatic bearing with respect the turbine casing. At least one of the first and second hydrostatic bearings comprises two bearing surfaces which face one another. At least one groove is formed on at least one of the two bearing surfaces. The at least one groove communicates with the bores of the sealing ring. At least one pressure-liquid line is coupled to each of the at least one groove and a pressure-liquid supply. The sealing ring is separated from each of the turbine casing and the rotor via gaps. The gaps may be in the range of between about 10 micrometers and about 350 micrometers.

BRIEF DESCRIPTION OF THE DRAWINGS

The invention is explained in more detail below with reference to the drawing in which.

DETAILED DESCRIPTION OF THE INVENTION

Figure 1:
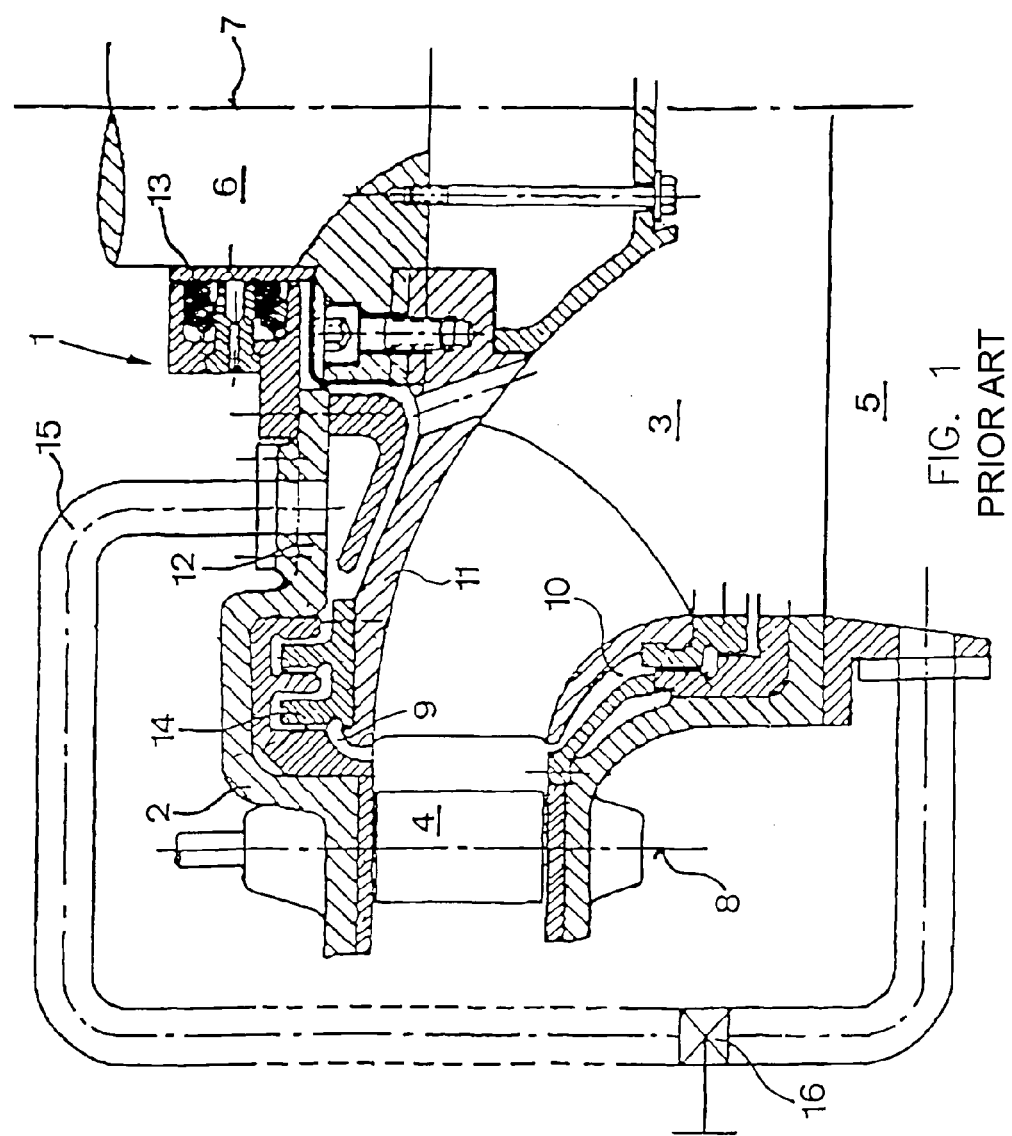
FIG. 1 shows a Francis turbine according to the prior art.

FIG. 1 shows diagrammatically a Francis turbine 1 according to the prior art, such as may be gathered from the book: "Rabe, Hydraulische Maschinen und Anlagen" ("Rabe, Hydraulic Machines and Plants"):

A rotor 3 rotates in a casing 2, the entry of the water taking place by way of a guide wheel 4 or its individual blades which are arranged rotatably, but with a fixed axis 8, in the casing 2. The rotor 3 has individual ducts which run in a curved manner both in the circumferential direction and with respect to the turbine axis 7, so that the water leaves the rotor 3 downwards essentially in the axial direction into the suction pipe 5.

Between the stationary casing 2 and the rotor 3, there are, of course, an upper gap or gap space 9 and a lower gap or gap space 10. The lower gap 10 leads to the loss of the gap water which passes into the region of the suction pipe, without the energy contained in it being capable of being worked off, but, apart from this loss, does not present any further problems.

This is in contrast to the gap water which passes into the upper gap space 9 between the rotor bottom 11 and the turbine cover 12. Since the turbine cover is closed off sealingly with respect to the rotating shaft 6 by way of a gland-type seal 13, virtually the pressure of the upper water (more precisely: the pressure before entry into the rotor) is established in this gap space 9. This leads to a considerable load on the shaft 6 or on its axial bearing. Furthermore, as a result of the water disc which is formed between the turbine cover 13 and the rotor bottom 11, considerable friction occurs, which, because of the high circumferential speeds of the order of magnitude of 35 m/s and the large lever arm relative to the rotor axis 7 of nowadays usually a few meters, leads to pronounced torques which brake the shaft rotation.

In order to diminish these problems, the prior art provides, in the outermost region of the rotor bottom 11, a labyrinth seal 14, the narrowest gaps of which are in the region of an order of magnitude of about 1 mm. In order to avoid the pressure build-up, which may be up to 30 bar and even above, leakage water is led through a relief line 15 via a throttle 16 to the suction pipe 5. Furthermore, relief bores may also be provided.

According to the invention, it is proposed to provide between the casing 2 and the turbine rotor 3, particularly, but not exclusively, at the peripheral region of the rotor bottom 11, a seal, by way of which the flow of the gap water is drastically reduced.

Figure 2:
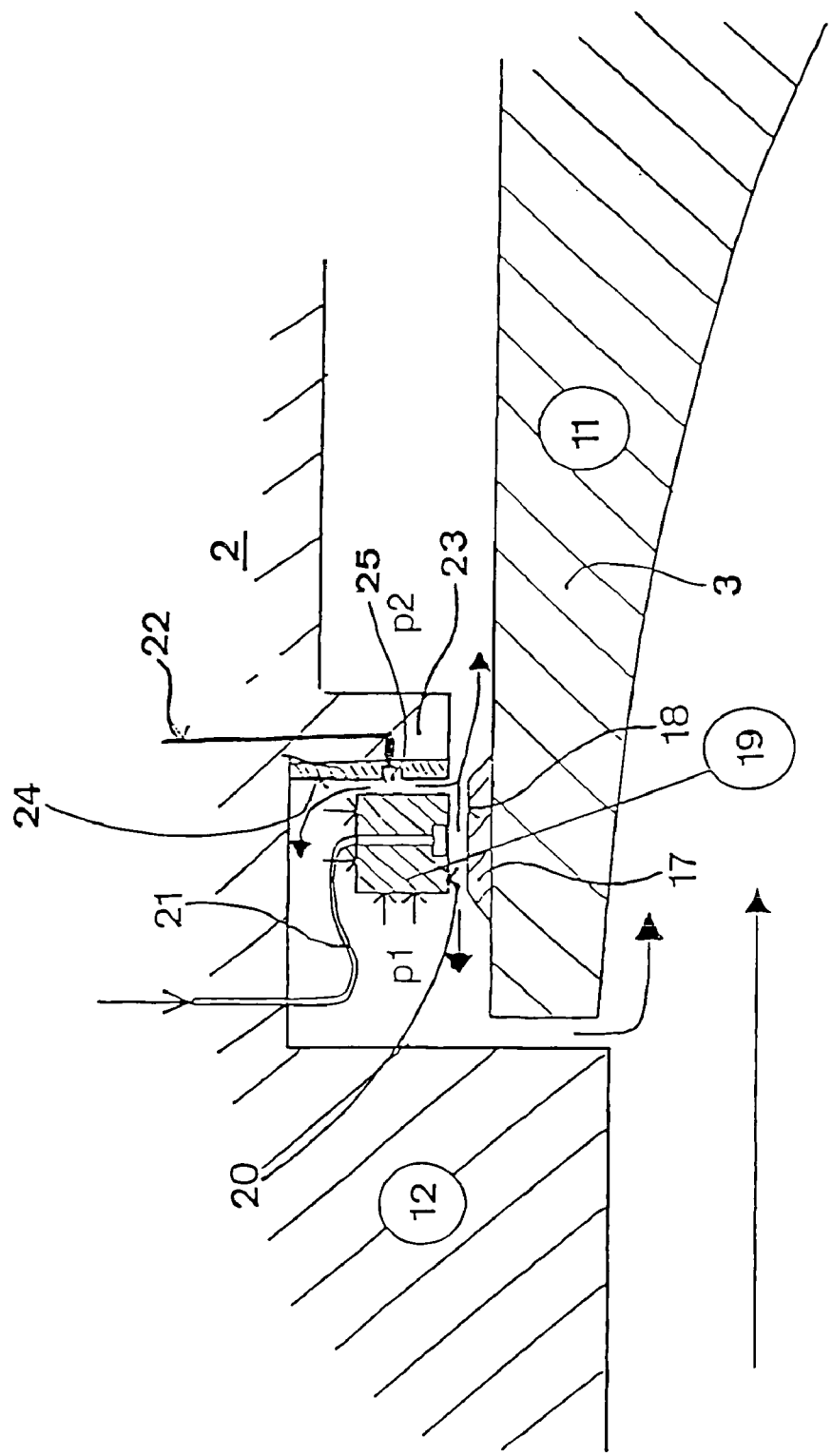
FIG. 2 shows the region between the casing upper part and the rotor bottom of an embodiment according to the invention.

Such a seal according to the invention is illustrated diagrammatically in FIG. 2: the rotor 3 has provided on it a running track 17 which, in the exemplary embodiment illustrated, is illustrated as a separate annular body. This does not have to be so, but the running track 17 may also be produced in one piece with the rotor 3 during the production of the latter, for example be lathe-turned or ground from the solid. The actual sealing surface 18 runs perpendicularly to the axis of rotation 7 of the turbine. One end face 20 of a sealing ring 19 co-operates with a sealing surface 18. In the exemplary embodiment illustrated, this sealing ring is illustrated in its simplest form with rectangular cross section. As explained in more detail further below, this form may be variously modified and be adapted to the particular features of the respective application.

The sealing ring 19 is stationary with respect to the casing cover 12, which means that it does not co-rotate with the rotor bottom 11. However, the sealing ring 19 is axially displaceable, within particular limits, with respect to the casing, in particular with respect to the turbine cover 12, as is explained in more detail below. A plurality of but at least one, flexible pressure-water lines 21 lead out of the region of the turbine cover 12 to the sealing ring 19. The sealing ring 19 has, if appropriate, inside it, at least one annular duct which opens into an annular groove on its lower end face 20 or merges into this groove or is formed by it. Pressure water supplied by way of the pressure-water lines 21 forms, in co-operation with the groove and with the sealing surface 18 located opposite it, a hydrostatic bearing for the sealing ring 19. The bearing gap in this case has a gap height in the range of about 10 micrometers to 350 micrometers, preferably about 100 to 250 micrometers, and is therefore narrow, as compared with the gap widths of the conventional labyrinth seal (FIG. 1).

It has not been possible to employ such a hydrostatic seal known per se in the present field of use on account of the extreme relative speeds, as already mentioned further above, in the region of an order of magnitude of 35 m/s and, above all, in view of the high pressures (30 bar and above) which occur and of the axial movements of the rotor 3 with respect to the turbine cover 12 which are considered too great for the use of hydrostatically mounted sealing rings, to be precise because it is necessary to guide the sealing ring 19 in the axial direction and this guidance has always failed hitherto as a result of the operating conditions outlined.

According to the invention, the problems associated with this are solved, in that the sealing ring 19 is guided on the turbine cover 12 moveably in the axial direction by way of a cylindrical hydrostatic bearing. This bearing is constructed as follows:

The turbine cover 12 has an annular strip 23 which projects in the axial direction towards the rotor 3 and of which the outer cylindrical surface (if appropriate, with a coating similar to that of the sealing surface 18) serves as a bearing surface 24. For this purpose, at least one groove 25 is provided in this bearing surface 24, and, as is customary in hydrostatic bearings, pressure water is supplied to the groove by way of at least one pressure-water line 22. Between the sealing ring 19 and the turbine cover 12, a mounting is thereby provided, which allows the sealing ring to execute a virtually friction-free movement in the axial direction. In addition, by virtue of this mounting, a "tilting" of the sealing ring 19 (actually, torsion or rolling-up) is reliably avoided. Such tilting of the sealing ring 19 is perfectly possible, without such guidance or mounting, under the dynamic loads acting on it and leads to the collapse of the sealing co-operation between the sealing ring 19 and the sealing surface 18.

The inventive solution to the sealing problem is beneficial not only dynamically, but also in energy terms and entails relatively simple and low investments. The pressure water for the two hydrostatic bearing surfaces can be extracted from the upper water of the turbine, so that (because of the centrifugal acceleration in the region of the sealing gap) no or only low pump capacity is necessary for overcoming the remaining pressure difference. Part of the pressure water flows radially outwards and thus passes into the rotor, so that a corresponding part of the invested pump capacity is recovered in the turbine. It is also essential that the penetration of foreign bodies is reliably avoided due to the radially outflowing pressure water. The components to be arranged on the rotor 3 and in the turbine casing 2 require scarcely any space, but in any case all events, less space than the previous labyrinth seal, and it is therefore also possible to retrofit existing turbines correspondingly.

Since the operating temperature of turbines is determined by the temperature of the water used, there are no problems of thermal expansion, even at the cylindrical gap between the sealing ring 19 and annular strip 23, in spite of the narrow gap height which is to be sought after.

Figure 3:
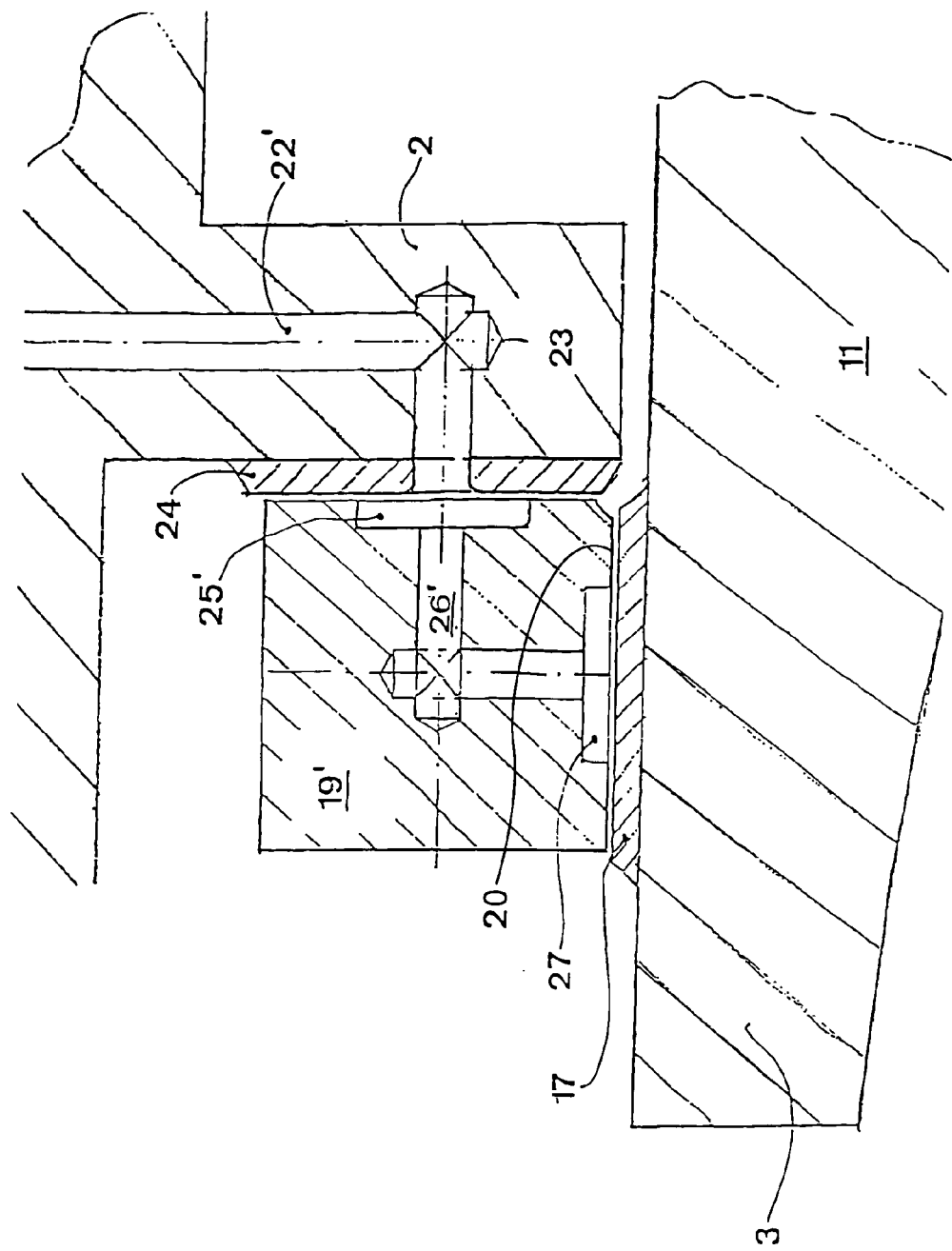
FIG. 3 shows a variant with a rotating sealing ring.

FIG. 3 shows a detail of the particularly preferred embodiment with a rotating sealing ring 19'. Here pressure water is supplied to the cylindrical wall surface of the annular strip 23 by way of the pressure-water line 22' and builds up the hydrostatic bearing already described between the annular strip 23 and the sealing ring 19' which in this case has a groove 25'. Part of the water supplied to the groove 25' in this way passes through bores 26' into the region of the groove 27 on the axial end face 20 of the sealing ring 19' and there, as just described above, builds up the hydrostatic bearing between the rotor 3 and the sealing ring 19'.

The flexible pressure-water lines 21 and the securing against rotation consequently become obsolete, without disadvantages having to be accepted. Quite to the contrary, the frictional losses are appreciably reduced by way of the sealing ring 19' rotating at approximately half the turbine rotational speed. Owing to the simple construction, this variant is also particularly suitable for subsequent installation in existing Francis turbines.

The number, dimensions and configurations of the bores 26' can easily be determined by a person skilled in the field of hydrodynamics, with a knowledge of the invention and of the respective requirements, and can be adapted to various operating conditions. Thus, it is possible to have oblique bores which are continuously straight from groove to groove (more precisely: from bearing surface to bearing surface, since, of course, the grooves may also be arranged in the opposite bearing surface).

The invention can be embodied in many ways and be adapted to existing or given conditions. Thus, it is not necessary for the sealing ring 19, 19' to have the rectangular form illustrated. It is perfectly possible to provide it with an L-shaped or other cross section and thus ensure the best possible adaptation of the sealing ring to the geometric and dynamic conditions. The surface of the sealing ring may be provided, in the region of the two bearings, with claddings, coverings or coatings, in order to avoid damage in the event of contact with the opposite surfaces.

Of course, it is possible, in particular, to provide the bearing surface between the sealing ring 19 and the rotor 3 with a plurality of grooves which, if appropriate, lie at least partially next to one another, and this may be advantageous particularly when the hydrostatic bearing thus formed is not to be designed as a (circumferentially) continuous bearing, but consists of a plurality of portions corresponding, for example, to sectors. The run of the (individual) groove (or grooves) is then not necessarily in the form of an arc of a circle, but may be spiral. A subdivision may be advantageous, in order, in the event of the penetration of foreign bodies or dirt, to ensure that the collapse of the hydrostatic mounting does not occur. It may happen that, if dirt enters, there is an insufficient supply of pressure water in individual geometrically delimited parts of the sealing surface completely, but this can be compensated by providing on the sealing ring 19 a plurality of bearing portions which are independent of one another and which, if appropriate, overlap one another correspondingly.

The pressure water supply to the two bearings flows essentially along the arrows (having fully inked tips) out of the actual bearing region and thus contributes to ensuring that no foreign bodies pass into the region of the narrow bearing gaps (FIG. 2).

The sealing ring 19 requires no axial pressing, the latter taking place by way of the pressure (indicated by the arrows with dashed tips) of the gap water surrounding it (surrounding pressure p1), but, under some circumstances, it is advantageously possible to provide a device for slight pressing (springs or the like), in order to hold the sealing ring in a predetermined position in the event of the standstill of the turbine after an operating intermission or an inspection has taken place. An emergency lift-off may likewise be provided for the sealing ring, for example in the event of an insufficient pressure of the pressure water.

Figure 4:
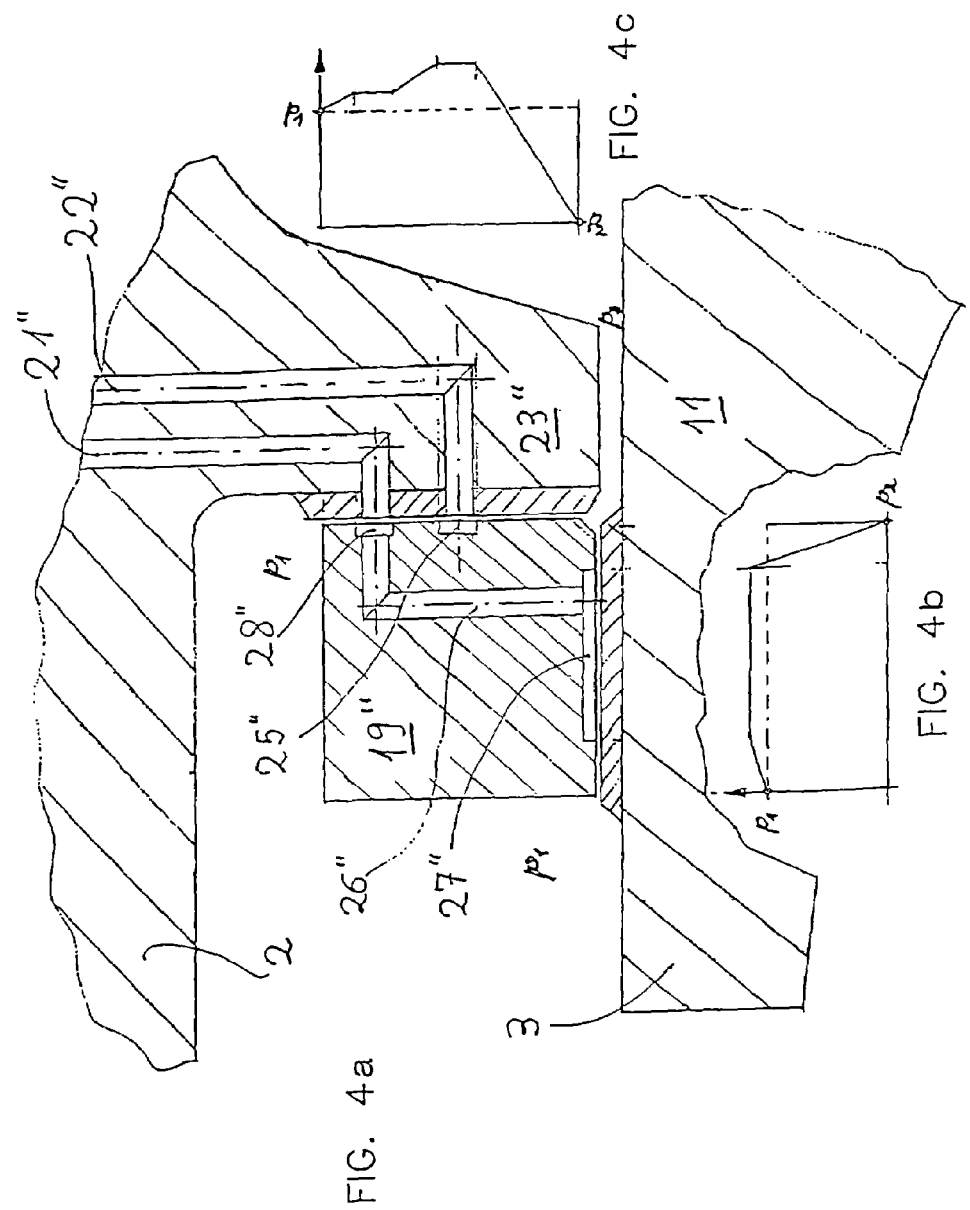
FIG. 4a shows a particularly preferred embodiment of the variant according to FIG. 3.
FIG. 4b shows a pressure profile chart representing the annular width of the sealing region.
FIG. 4c shows a pressure profile chart representing the annular length of the sealing region.

FIG. 4a shows a particularly preferred variant of the invention. The essential difference from FIG. 3 is that a hydrostatic bearing with two grooves 25" and 28" is provided in the sealing region between the annular strip 23" and the sealing ring 19". In this case, the groove 25" serves, in a similar way to the hydrostatic bearing groove 25 in FIG. 2, for non-contact mounting between the sealing ring 19" and the annular strip 23", and the groove 28" ensures, by way of bores 26", the delivery of pressure water to the hydrostatic bearing by way of the groove 27" between the sealing ring 19" and the rotor 3. This makes it possible, even with the sealing ring 19" rotating, to provide the two bearings 27", 28" with pressure water separately from one another, when only separate delivery lines 21" and 22" are provided.

In a further embodiment (FIG. 5), the sealing ring 19" has provided in it, instead of the groove 27''', depicted in as being wide, two narrower grooves 27" which are at a distance from one another and which are each fed independently from the groove 28" by way of bores 26". The stability of the mounting of the sealing ring 19" on the rotor 3 is consequently further increased.

This separation of the pressure-water supply of the two bearings has the result that, in the event of a change in the height of one of the two gaps, the pressure in the other gap (and consequently its height) is influenced to a substantially lesser extent than in the variant illustrated in FIG. 3, and, ideally, not at all. This not only improves the stability of the hydrostatic mounting in general, but, in particular, may damp periodic movements of the sealing ring or prevent them from being excited.

In this connection, the pressure-water supply will be dealt with briefly. It is advantageous and, under some circumstances, necessary to ensure that, in the event of a rise in the throughput in one of the (or some adjacent) supply lines, the throughflow remains as far as possible unchanged in the adjacent or other supply lines. However, this can easily be determined by a person skilled in the field of fluid mechanics, with a knowledge of the invention and of the boundary conditions, by way of corresponding dimensioning or co-ordination of the cross sections and/or the provision of corresponding throttles in the individual supply lines. A factor in achieving this aim is that the cross section of the bores provided in the sealing ring for supplying the axial seal is such (in the examples illustrated) that the throughflow of the pressure water takes place as far as possible free of loss.

In FIGS. 4a and 4b, the pressure profile is illustrated, respectively, against the seal width and length between the sealing ring 19" and the casing or the sealing ring 19" and the rotor 3: in this case, p1 stands for the pressure prevailing upstream of the sealing ring and p2 for the pressure downstream of the sealing ring in the gap between the annular strip 23" and the rotor bottom 11, as also explained above with reference to FIG. 1. As is clear, the pressure profiles can be influenced to a great extent by the position and dimensioning of the grooves 25", 28" and 27" and the position of these profiles in relation to the pressure p1 can be influenced to a great extent by the selection of the pressures prevailing in the supply lines 21" and 22". For a person skilled in the field of fluid mechanics, with a knowledge of the invention, this is not difficult and makes it possible to adapt to the most diverse boundary conditions.

Finally, it is possible to provide, in the region of the bearing surface or bearing surfaces between the sealing ring 19, 19', 19" and the components rotating opposite it, hydrodynamic lubricating pockets on at least one of the two bearing surfaces located opposite one another, in order to provide hydrodynamic mounting in addition to the hydrostatic mounting.

Figure 5:
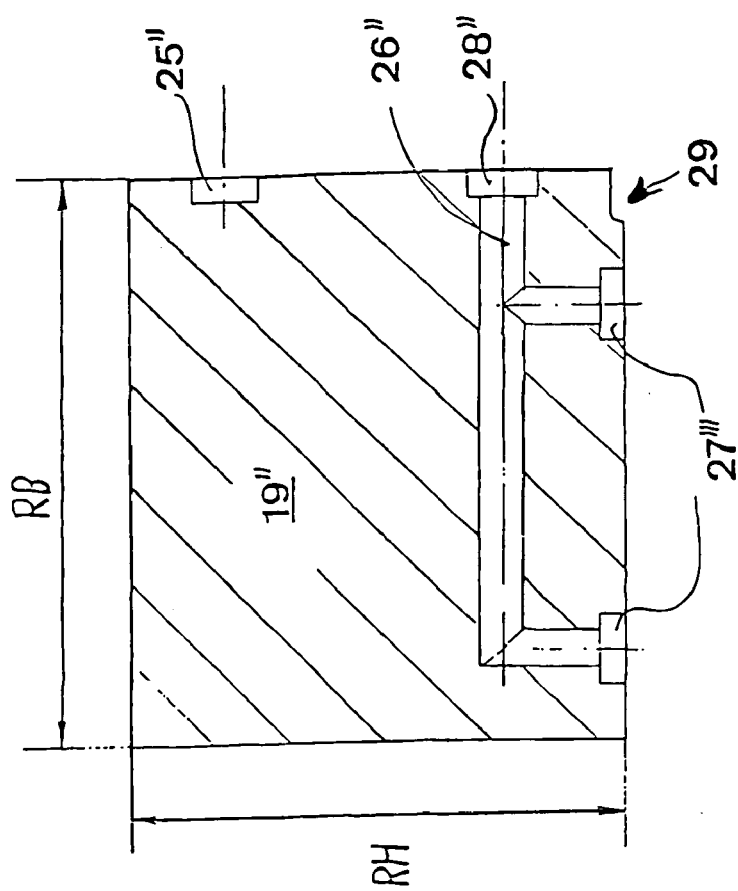
FIG. 5 shows a variant of the sealing ring according to the invention, similar to that of FIG. 4.

FIG. 5 shows a variant of a sealing ring, in which the supply of the axial seal takes place by way of bores 26" which emanate from the "lower" region (groove 28") of the radial seal. Here, furthermore, the axial bearing is different from that illustrated in FIG. 4, in that it has two grooves 27''' which are each supplied independently with pressure water. This change has no influence on the functioning of the bearing, since, of course, the hydrostatic pressure also builds up in the same way between the grooves. The sealing ring 19" of FIG. 5 has an essentially rectangular, but not square cross section, the annular width RB≠the annular height RH, and an asymmetric shoulder 29 is formed at the location of the gap between the casing and the rotor. It is thereby possible to compensate "rolling-up moments" acting on the sealing ring (equilibrium of moments) and to reduce the deformations of the sealing ring which are induced by them. In view of the bearing gaps which are only about 10 micrometers to 350 micrometers high, deformations of this kind are to be avoided as far as possible.

In the drawings, the seal between the sealing ring 19, 19', 19" and the casing 2 is always illustrated as a radial seal and the seal between the sealing ring and the rotor 11 as an axial seal. This may, of course, also be reversed and, for the run of the casing-side supply lines, may also afford advantages when, even if, in an arrangement of this type with a rotating sealing ring, the pressure water has to be conveyed counter to centrifugal acceleration in the sealing ring.

The sealing ring 19, 19', 19" and those surfaces of the rotor bottom 11 and of the turbine cover 2 which co-operate with it may consist of the materials conventionally used in hydrostatic seals, thus the surface 24 of the annular strip 23 (or this itself) or the surface of the running track 17 may consist of steel or of a bearing metal, and the sealing ring 19 may be formed from steel or likewise from a bearing metal or else from aluminium or an aluminium alloy. Of course, it is also possible, and in many cases advisable, to manufacture at least the sealing ring 19, 19' from a plastic, in particular a fibre-reinforced plastic, or from a ceramic material.

It is also conceivable, in an embodiment similar to that of FIG. 2, to provide both grooves of the hydrostatic bearing in the sealing ring 19 and to dispense with the pressure-water line 22, virtually to provide a counterpart to the variant of the co-rotating sealing ring 19'. The sealing ring 19 may be secured against co-rotation with the rotor bottom 11 in various ways, either by way of a shoulder and countershoulder or else by way of a correspondingly flexible and symmetrical suspension of the sealing ring on the turbine cover 12, the suspension preferably lying in a plane perpendicular to the turbine axis 7, so as not to transmit any appreciable forces in the axial direction and so as not to disturb the axial movement of the sealing ring with respect to the annular strip 23 by friction.

The invention has been discussed with reference to examples which relate to the most important seal in the area of Francis turbines, but it is clear to a person skilled in the art that the invention can also be applied advantageously at the other sealing points of Francis turbines and, of course, in all other hydraulic turbomachines, whether pumps or turbines, in all the gaps between their casing and their rotor.

The entire description and the claims speak of "pressure water" or "bearing water", but, of course, in special fields of use (for example, pumps in food technology), another liquid may be used instead of water, without departing from the of the invention. Finally, fields of use, in particular apart from Francis turbines, may be envisaged, in which the hydrostatic bearings are designed without grooves.

The invention claimed is:

1. An arrangement for sealing-off a rotor of a hydraulic turbomachine with respect to a turbine casing, wherein, in a peripheral region of the rotor, an overhung sealing ring is arranged and is mounted both with respect to the rotor and with respect to the turbine casing, in each case the arrangement includes at least one hydrostatic bearing, wherein each of the hydrostatic bearings has bearing surfaces facing one another, wherein at least one groove extends into at least one of the bearing surfaces, and wherein at least one pressure-water line, which is connected to a pressure-water supply, supplies pressure liquid into at least one of the bearing surfaces and the overhung sealing ring is secured against rotation with respect to the turbine casing.

2. The arrangement of claim 1, wherein the turbine casing comprises a radially outer cylindrical wall and an annular strip.

3. The arrangement of claim 1, wherein the at least one pressure-water line is a flexible pressure-water line.

4. The arrangement of claim 1, wherein a flexible pressure-water line is coupled to each of the turbine casing and the overhung sealing ring.

5. The arrangement of claim 1, wherein the at least one pressure-water line supplies pressure liquid to the bearing surface between the turbine casing and the overhung sealing ring, and wherein the overhung sealing ring has bores which supplies the pressure liquid to the bearing surface of the overhung sealing ring which forms one of the hydrostatic bearings with the bearing surface of the rotor.

6. The arrangement of claim 1, wherein the at least one pressure-water line comprises two pressure-water lines arranged at an axial distance from one another, the two pressure-water lines being disposed in the turbine casing and supplying pressure liquid to the bearing surface between the turbine casing and the overhung sealing ring, wherein one of the two pressure-water lines is located opposite a bore of the overhung sealing ring, and wherein the bore supplies pressure liquid to the bearing surface of the overhung sealing ring opposite the bearing surface of the rotor.

7. The arrangement of claim 1, wherein the at least one pressure-water line comprises a first pressure-water line supplying pressure liquid to the hydrostatic bearing between the overhung sealing ring and the rotor and a second pressure-water line supplying pressure liquid to the hydrostatic bearing between the overhung sealing ring and the turbine casing and wherein the first and second pressure-water lines supply pressure liquid independently of one another.

8. A system for providing sealing between a rotor and a turbine casing in a hydraulic turbomachine, the system comprising:
an overhung sealing ring for providing sealing between the rotor and the turbine casing;
the sealing ring being arranged in a peripheral region of the rotor and comprising at least two bearing surfaces;
a first hydrostatic bearing being formed by at least one of the at least two bearing surfaces and a surface of the turbine casing; and
a second hydrostatic bearing being formed by at least another of the at least two bearing surfaces and a surface of the rotor,
wherein pressure-liquid is delivered to each of the first and second hydrostatic bearings,
wherein the sealing ring follows movement of an outer region of the rotor, and wherein the sealing ring rotates with respect to the turbine casing.

9. The system of claim 8, further comprising at least one groove arranged on at least one of the bearing surfaces.

10. The system of claim 8, further comprising at least one pressure-liquid line coupled to at least one of the at least two bearing surfaces and a pressure-liquid supply.

11. The system of claim 8, further comprising at least one pressure-liquid line coupled to a pressure-liquid supply and to at least one groove arranged on at least one of the bearing surfaces.

12. The system of claim 8, wherein the turbine casing comprises a radially outer cylindrical wall.

13. The system of claim 8, wherein the surface of the rotor is arranged on an annular wall.

14. The system of claim 13, wherein the turbine casing comprises a turbine cover that includes an annular strip, and wherein a radially outer cylindrical wall of the turbine casing is arranged on the annular strip of the turbine cover.

15. The system of claim 8, further comprising at least one flexible pressure-liquid line supplying pressure-liquid to one of the first and second hydrostatic bearings.

16. The system of claim 8, wherein the sealing ring is flexibly suspended with respect to the turbine casing.

17. The system of claim 16, wherein the sealing ring can move axially with respect to an axis of rotation of the rotor and essentially in a plane perpendicular to the axis.

18. The system of claim 8, wherein the hydraulic turbomachine comprises a Francis turbine.

19. The system of claim 8, wherein the sealing ring comprises a rectangular cross-section.

20. The system of claim 19, wherein the at least two bearing surfaces of the sealing ring comprise only two bearing surfaces, one of the two bearing surfaces being an inner peripheral surface of the sealing ring and another of the two bearing surfaces being an annular surface of the sealing ring.

21. The system of claim 8, further comprising at least one pressure-liquid line which delivers liquid to the first and second hydrostatic bearings.

22. The system of claim 8, wherein the sealing ring comprises bores for delivering liquid to at least one of the first and second hydrostatic bearings.

23. The system of claim 8, wherein the sealing ring comprises bores for delivering liquid to each of the first and second hydrostatic bearings.

24. The system of claim 8, wherein each of the sealing ring and the turbine casing comprises bores for delivering liquid.

25. The system of claim 24, wherein the bores of the sealing ring and the turbine casing are arranged to allow liquid to pass from the turbine casing to the sealing ring and from the sealing ring to the rotor.

26. The system of claim 8, wherein the sealing ring comprises first bores for delivering liquid and wherein the turbine casing comprises second bores for delivering liquid.

27. The system of claim 26, wherein the second bores are arranged to allow liquid to pass from the turbine casing to the sealing ring and wherein the first bores are arranged to allow liquid to pass from the sealing ring to the rotor.

28. The system of claim 27, further comprising a first pressure line and a second pressure line, wherein the first pressure line is coupled to each of the first and second bores, and wherein the second pressure line is coupled to the second bores.

29. The system of claim 28, wherein the sealing ring comprises at least two grooves spaced from one another.

30. The system of claim 29, wherein the first pressure line delivers liquid to one of the at least two grooves and wherein the second pressure line delivers liquid to another of the at least two grooves.

31. The system of claim 8, wherein the sealing ring comprises at least two grooves spaced from one another.

32. The system of claim 31, wherein the at least two grooves are arranged on an annular surface which faces an annular surface of the turbine casing.

33. The system of claim 31, wherein the at least two grooves are arranged on only one annular surface of the sealing ring.

34. The system of claim 31, wherein the at least two grooves are arranged on an outer circumferential surface.

35. The system of claim 31, wherein the turbine casing comprises an outer circumferential surface.

36. The system of claim 31, wherein the at least two grooves are arranged on an inner circumferential surface.

37. The system of claim 8, wherein the surface of the rotor is arranged on a running track which projects out from the peripheral region of the rotor, the running track being one of a separate annular body and formed with the rotor as one piece.

38. A method of retrofitting a turbine using the system of claim 8, the method comprising:
   mounting the sealing ring to the turbine; and
   sealing the rotor to the turbine casing with the sealing ring.

39. A system for providing sealing between a rotor and a turbine casing in a hydraulic turbomachine, the system comprising:
   a sealing ring arranged in a peripheral region of the rotor;
   the sealing ring forming at least one hydrostatic bearing with respect to the rotor and at least another hydrostatic bearing with respect to the turbine casing;
   each hydrostatic bearing being formed by at least two bearing surfaces which face one another;
   at least one groove being arranged on at least one of the hydrostatic bearings; and
   at least one pressure-liquid line coupled to each of the at least one groove and a pressure-liquid supply,
   wherein the sealing ring rotates with respect to the turbine casing.

40. The system of claim 39, wherein the sealing ring rotates at a lower speed than the rotor.

41. A system for providing sealing between a rotor and a turbine casing in a hydraulic turbomachine, the system comprising:
   an overhung sealing ring arranged in a peripheral region of the rotor;
   the sealing ring comprising bores and forming only one hydrostatic bearing with respect to the rotor and only one hydrostatic bearing with respect to the turbine casing;
   at least one of the first and second hydrostatic bearings comprising two bearing surfaces which face one another;
   at least one groove being formed on at least one of the two bearing surfaces;
   the at least one groove communicating with the bores of the sealing ring; and
   at least one pressure-liquid line coupled to each of the at least one groove and a pressure-liquid supply,
   wherein the sealing ring is separated from each of the turbine casing and the rotor via gaps and the sealing ring rotates with respect to the turbine casing.

42. The system of claim 41, wherein the gaps are in the range of between about 10 micrometers and about 350 micrometers.

43. A system for providing sealing between a rotor and a turbine casing in a hydraulic turbomachine, the system comprising:
   an overhung sealing ring arranged in a peripheral region of the rotor; the sealing ring forming at least one hydrostatic bearing with respect to the rotor and
   at least another hydrostatic bearing with respect to the turbine casing;
   each hydrostatic bearing being formed by at least two bearing surfaces which face one another;
   at least one groove being arranged on at least one of the bearing surfaces; and at least one pressure-liquid line coupled to a pressure-liquid supply and at least one of: at least one of the bearing surfaces and the at least one groove, and wherein the sealing ring rotates with respect to the turbine casing.

44. The system of claim 43, wherein one of the bearing surfaces is arranged on a radially outer cylindrical wall of the turbine casing.

45. The system of claim 43, wherein one of the bearing surfaces is arranged on an annular wall of the rotor.

46. The system of claim 43, wherein the sealing ring is secured against rotation with respect to the turbine casing.

47. The system of claim 43, wherein the at least one pressure-liquid line comprises a flexible line.

48. The system of claim 43, wherein the sealing ring is flexibly suspended with respect to the turbine.

49. The system of claim 48, wherein the sealing ring can move both mainly axially with respect to an axis of rotation of the rotor and essentially in a plane perpendicular to the axis.

50. The system of claim 48, wherein the sealing ring can move axially with respect to an axis of rotation of the rotor.

51. The system of claim 48, wherein the hydraulic turbomachine is a Francis turbine.

52. The system of claim 48, wherein the sealing ring can move each of axially with respect to an axis of rotation of the rotor and essentially in a plane perpendicular to the axis.

53. The system of claim 43, wherein the at least one pressure-liquid line delivers liquid to each of the hydrostatic bearings.

54. The system of claim 43, wherein the sealing ring comprises bores for delivering liquid to at least one of the bearing surfaces.

55. The system of claim 43, wherein the sealing ring comprises bores for delivering liquid to each of the bearing surfaces.

56. The system of claim 43, wherein each of the sealing ring and the turbine casing comprises bores for delivering liquid.

57. The system of claim 56, wherein the bores of the sealing ring and the turbine casing are arranged to allow liquid to pass from the turbine casing to the sealing ring and from the sealing ring to the rotor.

58. The system of claim 43, wherein the sealing ring comprises first bores for delivering liquid and wherein the turbine casing comprises second bores far delivering liquid.

59. The system of claim 58, wherein the second bores are arranged to allow liquid to pass from the turbine casing to the sealing ring and wherein the first bores are arranged to allow liquid to pass from the sealing ring to the rotor.

60. The system of claim 59, wherein the at least one pressure-liquid line comprises a first pressure line and a second pressure line, wherein the first pressure line is coupled to each of the first and second bores, and wherein the second pressure line is coupled to the second bores.

61. The system of claim 43, wherein the sealing ring forms only one hydrostatic bearing with respect to the rotor and only one hydrostatic bearing with respect to the turbine casing.

62. The system of claim 43, wherein the at least one groove comprises at least two grooves spaced from one another.

63. The system of claim 62, wherein the at least two grooves are arranged on an annular surface.

64. The system of claim 62, wherein the at least two grooves are arranged on an annular axial surface of the sealing ring.

65. The system of claim 62, wherein the at least two grooves are arranged on an outer circumferential surface.

66. The system of claim 62, wherein the at least two grooves are arranged on an outer circumferential surface of the turbine casing.

67. The system of claim 62, wherein the at least two grooves are arranged on an inner circumferential surface.

68. The system of claim 62, wherein the at least two grooves are arranged on an inner circumferential surface of the sealing ring.

69. The system of claim 43, wherein the sealing ring rotates at a lower speed than the rotor.

70. A method of retrofitting a turbine using the system of claim 43, the method comprising:

mounting the sealing ring to the turbine; and sealing the rotor to the turbine casing with the sealing ring.

* * * * *